United States Patent
O'Connor et al.

(10) Patent No.: US 11,319,085 B2
(45) Date of Patent: May 3, 2022

(54) FUEL OXYGEN CONVERSION UNIT WITH VALVE CONTROL

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Richard Alan Wesling, Cincinnati, OH (US); Christian Xavier Stevenson, Blanchester, OH (US); Peter Allen Andrews, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 474 days.

(21) Appl. No.: 16/178,927

(22) Filed: Nov. 2, 2018

(65) Prior Publication Data
US 2020/0140109 A1    May 7, 2020

(51) Int. Cl.
| | |
|---|---|
| *B64D 37/34* | (2006.01) |
| *F02M 37/22* | (2019.01) |
| *F02C 7/22* | (2006.01) |
| *F02C 7/232* | (2006.01) |
| *B01D 19/00* | (2006.01) |
| *F02C 7/224* | (2006.01) |

(52) U.S. Cl.
CPC .............. *B64D 37/34* (2013.01); *F02C 7/222* (2013.01); *F02C 7/232* (2013.01); *F02M 37/22* (2013.01); *B01D 19/0063* (2013.01); *B01D 2257/104* (2013.01); *F02C 7/224* (2013.01); *F05D 2210/13* (2013.01)

(58) Field of Classification Search
CPC ......... B64D 37/34; F02M 37/22; F02C 7/232; F02C 7/22; B60K 3/04
See application file for complete search history.

(56) References Cited

U.S. PATENT DOCUMENTS

| | | | |
|---|---|---|---|
| 2,582,842 | A | 1/1952 | Messinger |
| 2,720,313 | A | 10/1955 | Pattison |
| 2,893,628 | A | 7/1959 | Herman |
| 3,050,240 | A | 8/1962 | Darnell |
| 3,178,105 | A | 4/1965 | Darnell |
| 3,590,559 | A | 7/1971 | Bragg |
| 3,847,298 | A | 11/1974 | Hamilton |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

U.S. Appl. No. 15/819,327, filed Nov. 28, 2017.

(Continued)

*Primary Examiner* — Youngsul Jeong
(74) *Attorney, Agent, or Firm* — Dority & Manning, P.A.

(57) ABSTRACT

A fuel oxygen conversion unit includes a contactor; a fuel gas separator, the fuel oxygen conversion unit defining a circulation gas flowpath from the fuel gas separator to the contactor; and an isolation valve in airflow communication with the circulation gas flowpath for modulating a gas flow through the circulation gas flowpath to the contactor.

19 Claims, 5 Drawing Sheets

(56) References Cited

U.S. PATENT DOCUMENTS

| | | | |
|---|---|---|---|
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,315,815 B1* | 11/2001 | Spadaccini ............ B01D 53/22 95/46 |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,153,343 B2 | 12/2006 | Burlatsky et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2* | 6/2017 | Johnson ............ B01D 19/0005 |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2005/0137441 A1 | 6/2005 | Cordatos et al. |
| 2007/0130956 A1 | 6/2007 | Chen |
| 2008/0083608 A1* | 4/2008 | Cipollini ............ B01D 19/0031 204/157.5 |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1* | 6/2016 | Lo .................... B01D 19/0068 96/187 |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |

(56) References Cited

FOREIGN PATENT DOCUMENTS

| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

* cited by examiner

FUEL OXYGEN CONVERSION UNIT WITH VALVE CONTROL

FIELD

The present subject matter relates generally to a fuel oxygen conversion unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose. Certain of these fuel oxygen conversion systems may introduce a stripping gas to absorb or otherwise react with the fuel to reduce an oxygen content of the fuel. However, if not properly removed, excess gas in the fuel system provided to the combustion section can cause undesirable results, such as undesirable combustion dynamics.

Accordingly, a fuel oxygen conversion system configured to reduce an amount of gas in the deoxygenated fuel provided to a combustion section of an engine would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen conversion unit is provided for a vehicle or an engine of the vehicle. The fuel oxygen conversion unit includes a contactor; a fuel gas separator, the fuel oxygen conversion unit defining a circulation gas flowpath from the fuel gas separator to the contactor; and an isolation valve in airflow communication with the circulation gas flowpath for modulating a gas flow through the circulation gas flowpath to the contactor.

In certain exemplary embodiments the fuel oxygen conversion unit further defines a bypass gas flowpath in fluid communication with the circulation gas flowpath at a first location positioned upstream of the contactor and a second location positioned downstream of the fuel gas separator, wherein the isolation valve is further in fluid communication with the bypass gas flowpath and configured for selectively diverting the gas flow through the circulation gas flowpath to the bypass gas flowpath.

For example, in certain exemplary embodiments the isolation valve is a diverter valve positioned at the first location or at the second location.

For example, in certain exemplary embodiments the isolation valve is a first diverter valve positioned at the first location, and wherein the fuel oxygen conversion unit further includes a second diverter valve positioned at the second location.

For example, in certain exemplary embodiments the fuel oxygen conversion unit further includes a gas boost pump, wherein the first location is further positioned downstream of the gas boost pump.

For example, in certain exemplary embodiments the fuel oxygen conversion unit further includes a catalyst, wherein the second location is further positioned upstream of the catalyst.

In certain exemplary embodiments the fuel oxygen conversion unit further includes a gas boost pump, wherein the gas boost pump and the fuel gas separator are mechanically coupled such that the gas boost pump is rotatable with the fuel gas separator.

In certain exemplary embodiments the isolation valve is a shutoff valve for shutting off the gas flow through the circulation gas flowpath.

For example, in certain exemplary embodiments the shut off valve is a first shutoff valve, and wherein the fuel oxygen conversion unit further includes a second shutoff valve, wherein the first shutoff valve is positioned upstream of the contactor in the circulation gas flowpath, and wherein the second shutoff valve is positioned downstream of the fuel gas separator in the circulation gas flowpath.

For example, in certain exemplary embodiments the fuel oxygen conversion unit further includes a catalyst; and a gas boost pump, wherein the first shutoff valve is positioned downstream of the catalyst and the gas boost pump, and wherein the second shutoff valve is positioned upstream of the catalyst and the gas boost pump.

In certain exemplary embodiments the fuel oxygen conversion unit further includes a stripping gas source selectively in fluid communication with the circulation gas flowpath for selectively introducing a stripping gas from the stripping gas source to the circulation gas flowpath.

In certain exemplary embodiments the stripping gas source is a stripping gas tank.

In another exemplary embodiment of the present disclosure a gas turbine engine of the vehicle is provided. The gas turbine engine includes a combustion section; a fuel delivery system for providing a flow of fuel to the combustion section; and a fuel oxygen conversion unit. The fuel oxygen conversion unit includes a contactor defining a liquid fuel inlet, a stripping gas inlet, and a fuel/gas mixture outlet. The fuel oxygen conversion unit also includes a fuel gas separator defining a fuel/gas mixture inlet, a liquid fuel outlet, and a stripping gas outlet, the liquid fuel inlet of the contactor and the liquid fuel outlet of the fuel gas separator in fluid communication with the fuel delivery system, the fuel oxygen conversion unit further defining a circulation gas flowpath from the stripping gas outlet of the fuel gas separator to the stripping gas inlet of the contactor. The fuel oxygen conversion unit also includes an isolation valve in airflow communication with the circulation gas flowpath for modulating a gas flow through the circulation gas flowpath to the contactor.

In an exemplary aspect of the present disclosure, a method is provided of operating a fuel oxygen conversion unit for a gas turbine engine, the fuel oxygen conversion unit defining a circulation gas flowpath and including a contactor, a fuel gas separator, and an isolation valve. The method includes receiving data indicative of an operating condition parameter for the fuel oxygen conversion unit, the gas turbine engine, or both; and modulating the isolation valve in airflow communication with the circulation gas flowpath of the fuel oxygen conversion unit to modify a stripping gas flow to or through the contactor of the fuel oxygen conversion unit in response to the received data, the contactor positioned upstream of the fuel gas separator of the fuel oxygen conversion unit.

In certain exemplary aspects the operating condition parameter is a speed parameter, and wherein the speed parameter is indicative of a rotational speed of the fuel gas separator of the fuel oxygen conversion unit, the gas turbine engine, or both.

For example, in certain exemplary aspects receiving data indicative of the speed parameter includes receiving data indicative of a rotational speed of the fuel gas separator, the gas turbine engine, or both being below a predetermined threshold, and wherein modulating the isolation valve in airflow communication with the circulation gas flowpath includes reducing the stripping gas flow to or through the contactor of the fuel oxygen conversion unit in response to receiving data indicative of the rotational speed of the fuel gas separator, the gas turbine engine, or both being below the predetermined threshold.

For example, in certain exemplary aspects receiving data indicative of the speed parameter includes receiving data indicative of a rotational speed of the fuel gas separator, the gas turbine engine, or both being above a predetermined threshold, and wherein modulating the isolation valve in airflow communication with the circulation gas flowpath includes increasing the stripping gas flow to or through the contactor of the fuel oxygen conversion unit in response to receiving data indicative of the rotational speed of the fuel gas separator, the gas turbine engine, or both being above the predetermined threshold.

In certain exemplary aspects modulating the isolation valve in airflow communication with the circulation gas flowpath includes diverting the stripping gas flow around the contactor through a bypass gas flowpath.

In certain exemplary aspects modulating the isolation valve in airflow communication with the circulation gas flowpath includes shutting off the stripping gas flow through the circulation gas flowpath at a location upstream of the contactor.

In certain exemplary aspects the operating condition parameter is indicative of an operating mode of the fuel oxygen conversion unit, the gas turbine engine, or both, and wherein receiving data indicative of the operating condition parameter includes receiving data indicative of the fuel oxygen conversion unit, the gas turbine engine, or both being in a startup operating mode, and wherein modulating the isolation valve in airflow communication with the circulation gas flowpath of the fuel oxygen conversion unit includes providing a flow of stored stripping gas to the circulation gas flowpath at a location upstream of the contactor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
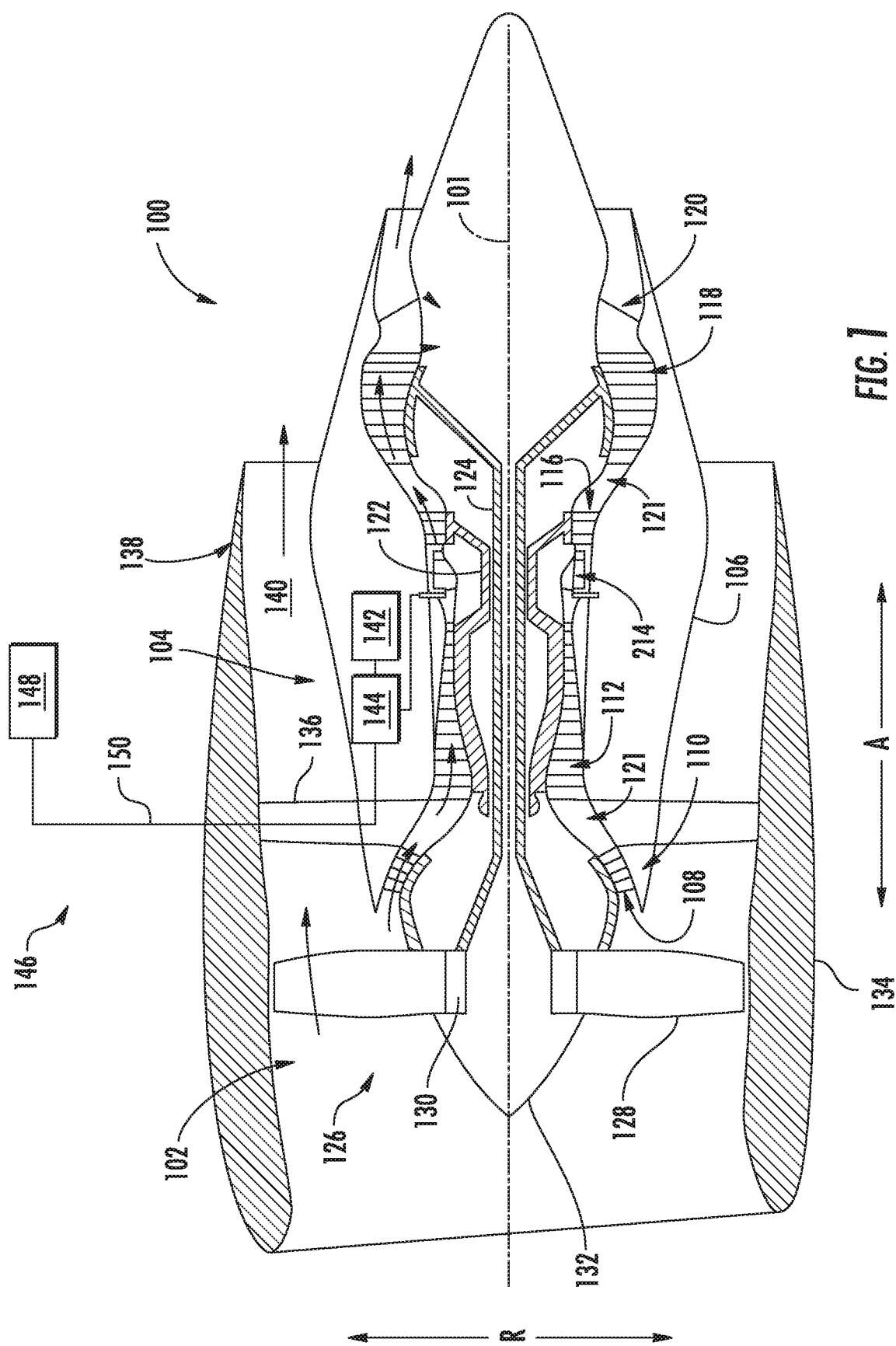
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion unit" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen conversion unit 144 positioned within the turbomachine 104, i.e., within the casing 106 of the turbomachine 104, in other embodiments, the fuel oxygen conversion unit 144 may be positioned at any other suitable location. For example, in other embodiments, the fuel oxygen conversion unit 144 may instead be positioned remote from the turbofan engine 100, such as proximate to, or within, the tank of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc.

Figure 2:
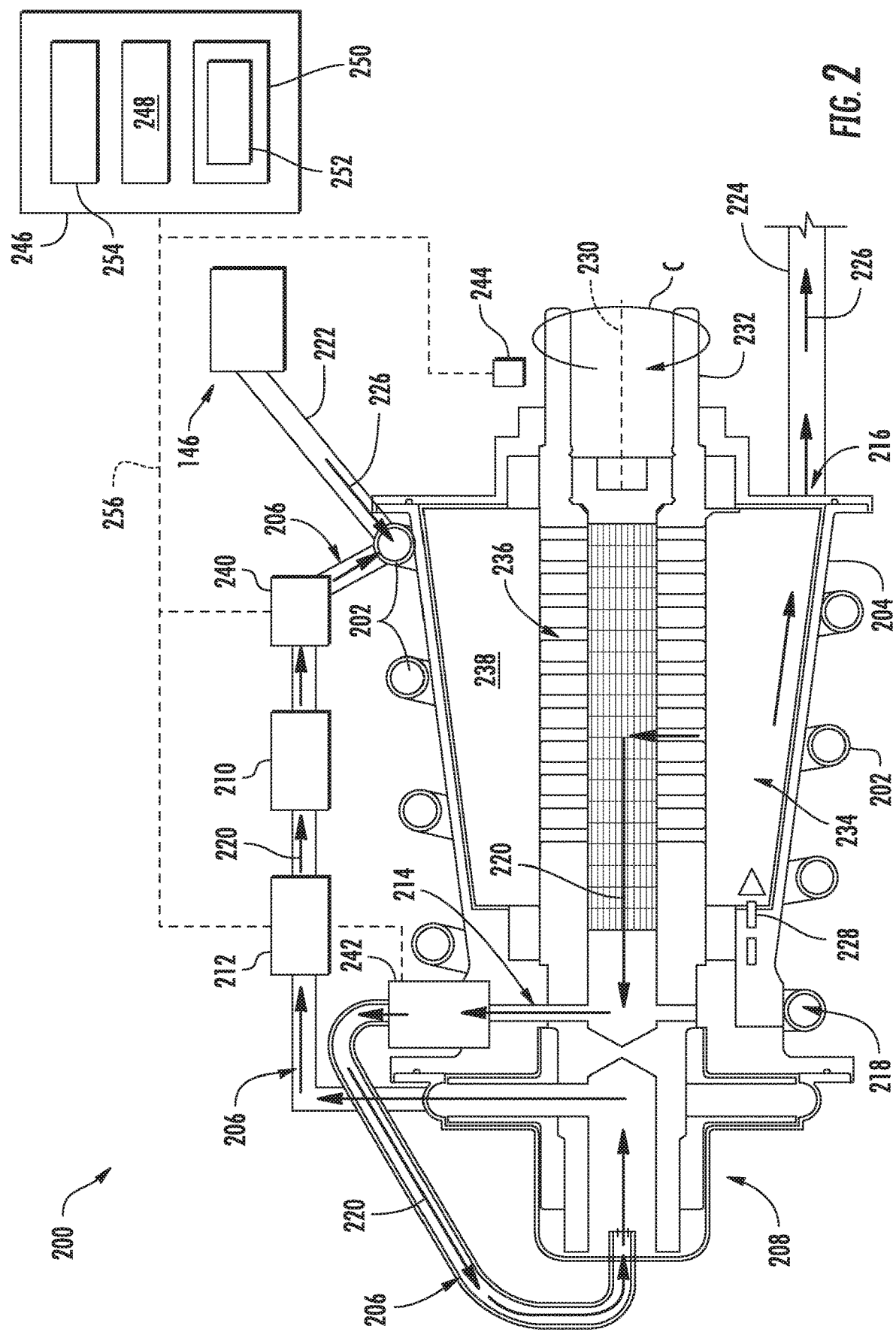
FIG. 2 is a schematic, cross-sectional view of a fuel oxygen conversion unit in accordance with an exemplary embodiment of the present disclosure.

Referring now to FIG. 2, schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202, a fuel gas separator 204, and an isolation valve. The exemplary contactor 202 depicted is configured as a tube extending circumferentially around the fuel gas separator 204 for the embodiment shown, however in other embodiments, the contactor 202 may be configured in any other suitable manner to substantially mix a received gas and liquid flow, as will be described below. For example, the contactor 202 may, in other embodiments be a mechanically driven contactor 202 (e.g., having paddles for mixing the received flows).

Moreover, the exemplary fuel oxygen conversion unit 200 defines a circulation gas flowpath 206 extending from the fuel gas separator 204 to the contactor 202. The isolation valve is in airflow communication with the circulation gas flowpath 206 for modulating a gas flow through the circulation gas flowpath 206 to the contactor 202, or rather a flow of stripping gas 220, as will be described below. In certain exemplary embodiments, the circulation gas flowpath 206 may be formed of any combination of one or more conduits, tubes, pipes, etc., as well as structures of components within the circulation gas flowpath 206.

Briefly, it will be appreciated that the fuel oxygen conversion unit 200 generally provides for a flow of stripping gas 220 through the stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Further, for the exemplary oxygen conversion unit depicted in FIG. 2, the fuel oxygen conversion unit 200 further includes a gas boost pump 208, a catalyst 210, and a pre-heater 212. For the embodiment shown, the gas boost pump 208, the catalyst 210, and the pre-heater 212 are each arranged within the circulation gas flowpath 206 in series flow. Additionally, the gas boost pump 208 is configured as a rotary gas pump mechanically coupled to, and driven by the fuel gas separator 204. In such a manner, the gas boost pump 208 is rotatable with fuel gas separator 204 (such rotation to be described in greater detail below). However, in other embodiments, the gas boost pump 208 may be configured in any other suitable manner. For example, in other embodiments, the gas boost pump 208 may be mechanically disconnected from, and independently rotatable relative to, the fuel gas separator 204. For example, in certain embodiments, the gas boost pump 208 may be independently coupled to an accessory gearbox, or may be an electric pump electrically coupled to a suitable electrical power source. In such an embodiment, the gas boost pump 208 may rotate at a different rotational speed than the fuel gas separator 204.

Referring still to the embodiment of FIG. 2, it will be appreciated that the fuel gas separator 204 generally defines a gas outlet 214, a liquid fuel outlet 216, and an inlet 218. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines 150, and in particular, an inlet fuel line 222 and an outlet fuel line 224. The inlet fuel line 222 is fluidly connected to the contactor 202 for providing a flow of liquid fuel 226 to the contactor 202 (e.g., from a fuel source, such as a fuel tank) and the outlet fuel line 224 is fluidly connected to the liquid fuel outlet 216 of the fuel gas separator 204 for receiving a flow of deoxygenated liquid fuel 226.

During typical operations, a stripping gas 220 flows from the gas outlet 214 of the fuel gas separator 204, through the circulation gas flowpath 206 in a direction from the fuel gas separator 204 to the contactor 202. More specifically, during typical operations, stripping gas 220 flows from the gas outlet 214 of the fuel gas separator 204, and through the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202) is then provided through, for the embodiment depicted, a pre-heater 212 configured to add heat energy to the gas flowing therethrough, through the catalyst 210, and to the contactor 202, wherein the stripping gas 220 is mixed with the flow of liquid fuel 226 from the inlet fuel line 222 to generate a fuel gas mixture 228. The fuel gas mixture 228 generated within the contactor is provided to the inlet 218 of the fuel gas separator 204.

Generally, it will be appreciated that during operation of the fuel oxygen conversion unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flowpath 206 to the contactor 202).

Within the fuel gas separator 204 the relatively high oxygen content stripping gas 220 is then separated from the relatively low oxygen content fuel 226. Specifically, for the embodiment shown, the fuel gas separator 204 defines a central axis 230 and a circumferential direction C extending about the central axis 230. Additionally, the fuel gas separator 204 is configured as a mechanically-driven fuel gas separator, or more specifically as a rotary/centrifugal fuel gas separator. Accordingly, the fuel gas separator 204 includes an input shaft 232 and a separation assembly 234, the input shaft 232 mechanically coupled to the separation assembly 234, the two components together rotatable about the central axis 230. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric motor.

Additionally, the exemplary separation assembly 234 depicted generally includes an inner filter 236 arranged along the central axis 230, and a plurality of paddles 238 positioned radially outward of the inner filter 236. During operation, a rotation of the separation assembly 234 about the central axis 230, and more specifically, a rotation of the plurality of paddles 238 about the central axis 230 (i.e., in the circumferential direction C), may generally force heavier liquid fuel 226 outward and lighter stripping gas 220 inward through the inner filter 236. In such a manner, the liquid fuel 226 may exit through the liquid fuel outlet 216 of the fuel gas separator 204 and the stripping gas 220 may exit through the gas outlet 214 of the fuel gas separator 204, as is indicated.

Accordingly, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may an oxygen content of less than about five (5) parts per million ("ppm"), such as less than about three (3) ppm, such as less than about two (2) ppm, such as less than about one (1) ppm, such as less than about 0.5 ppm Further, as will be appreciated, the exemplary fuel oxygen conversion unit 200 recirculates and reuses the stripping gas 220 (i.e., the stripping gas 220 operates in a substantially closed loop). However, the stripping gas 220 exiting the fuel gas separator 204, having interacted with the liquid fuel 226, has a relatively high oxygen content. Accordingly, in order to reuse the stripping gas 220, an oxygen content of the stripping gas 220 from the outlet 214 of the fuel gas separator needs to be reduced. For the embodiment depicted, and as noted above, the stripping gas 220 flows through the gas boost pump 208, through the pre-heater 212, and to the catalyst 210 where the oxygen content of the stripping gas 220 is reduced. More specifically, within the catalyst 210 the relatively oxygen-rich stripping gas 220 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these configurations, a byproduct may be produced, such as water. The water, if produced, may be in vapor form and continue as part of the stripping gas 220. Alternatively, the water or other byproduct, if produced, may be ducted away from the catalyst 210 (duct not depicted in the embodiment of FIG. 2). In one or more of these embodiments, the catalyst 210 may be configured to reduce an oxygen content of the stripping gas 220 to less than about three percent (3%) oxygen (O2) by mass, such less than about one percent (1%) oxygen (O2) by mass.

The resulting relatively low oxygen content gas is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen conversion unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), a gas mixture made up of at least 50% by mass inert gas, or some other gas or gas mixture having a relatively low oxygen content.

However, it will be appreciated that during certain operating conditions of the fuel oxygen conversion unit 200 and/or the gas turbine engine including such fuel oxygen conversion unit 200, the fuel gas separator 204 may not be operating at peak efficiency. For example, during a startup of the gas turbine engine (or a shutdown of the gas turbine engine), the rotating components thereof may not be rotating as quickly as compared to during certain steady-state operations, such as cruise. Given that the fuel gas separator 204 may be driven through an accessory gearbox of the engine, the separation assembly 234 of the fuel gas separator 204 may be rotating relatively slowly during such conditions, such as below a minimally effective rotational speed. The minimally effective rotational speed may refer to a minimum speed required for separating liquid fuel 226 and stripping gas 220 from the fuel gas mixture 228 provided through the inlet 218 with sufficient efficiency to ensure that no more than an acceptable amount of gas is allowed through outlet line 224. If the fuel gas separator 204 is provided a fuel gas mixture 228 when rotating below this minimally effective rotational speed, it is accordingly possible that a higher than acceptable, or desired, amount of stripping gas 220 may flow through the liquid fuel outlet 216 to the outlet line 224. Undesirably high amounts of gas within the liquid fuel lines may reduce an efficiency of the fuel delivery system 146, and/or may cause an inefficient and/or inconsistent fuel flow to a combustion section of the gas turbine engine, which may result in undesirable combustor dynamics.

Accordingly, the present disclosure provides various features for minimizing a likelihood of an undesirably high amount of stripping gas 220 being provided through the fuel outlet 216 of the fuel gas separator 204 when the fuel gas separator 204 is operated, e.g., below the minimum effective rotational speed.

Specifically, as noted above, the exemplary fuel oxygen conversion unit 200 depicted includes the isolation valve in airflow communication with the circulation gas flowpath 206 for modulating a stripping gas 220 flow through the circulation gas flowpath 206 and to the contactor 202. In such a manner, the isolation valve may cut off or substantially reduce a flow of stripping gas 220 through the circulation gas flowpath 206 to the contactor 202 when the fuel gas separator 204 is operating, e.g., below the minimum effective rotational speed.

More specifically, for the embodiment shown, the isolation valve is a shut off valve for shutting off the stripping gas 220 flow through the circulation gas flowpath 206 and, e.g., to the contactor 202. More specifically still, the shut off valve is a first shut off valve 240, and the fuel oxygen conversion unit 200 further includes a second shut off valve 242. The first shut off valve 240 is positioned upstream of the contactor 202 in the circulation gas flowpath 206 and the second shut off valve 242 is positioned downstream of the fuel gas separator 204 in the circulation gas flowpath 206. More specifically, the first shut off valve 240 is positioned, for the embodiment shown, downstream of the catalyst 210 and pre-heater 212 and upstream of the contactor 202 in the circulation gas flow path 206, and the second shut off valve 242 is positioned downstream of the fuel gas separator 204 and upstream of the gas boost pump 208 in the circulation gas flowpath 206. Notably, however, in other exemplary embodiments, the fuel oxygen conversion unit 200 may only include one of the shut off valves 240 or 242.

The first shut off valve 240, second shut off valve 242, or both may be configured in any suitable manner for shutting off or otherwise reducing the stripping gas 220 flow through the circulation gas flowpath 206. For example, the first shut off valve 240, second shut off valve 242, or both may be configured as a ball valve, a flapper valve (such as a butterfly valve) a poppet valve, etc.

Further, for the embodiment shown, the fuel oxygen conversion unit 200 is operable with a control system. The control system generally includes a sensor 244 configured to sense data indicative of a rotational speed of the input shaft 232 of the fuel gas separator 204, the separation assembly 234 of the fuel gas separator 204, or both, as well as a controller 246. Additionally, or alternatively, the control system may be operable with one or more sensors of an engine with which it is installed. For example, the control system may be configured to receive data indicative of a rotational speed of a spool (such as an HP spool) driving an accessory gearbox, which is in turn driving the fuel gas separator 204. Such rotational speed of the spool may be used to determine a rotational speed of the fuel gas separator 204.

The exemplary controller 246 depicted includes one or more processor(s) 248 and one or more memory device(s) 250. The one or more processor(s) 248 can include any suitable processing device, such as a microprocessor, microcontroller, integrated circuit, logic device, and/or other suitable processing device. The one or more memory device(s) 250 can include one or more computer-readable media, including, but not limited to, non-transitory computer-readable media, RAM, ROM, hard drives, flash drives, and/or other memory devices.

The one or more memory device(s) 250 can store information accessible by the one or more processor(s) 248, including computer-readable instructions 252 that can be executed by the one or more processor(s) 248. The instructions 252 can be any set of instructions that when executed by the one or more processor(s) 248, cause the one or more processor(s) 248 to perform operations. In some embodiments, the instructions 252 can be executed by the one or more processor(s) 248 to cause the one or more processor(s) 248 to perform operations, such as any of the operations and functions for which the computing system and/or the controller 246 are configured, the operations for operating a fuel oxygen conversion unit 200 (e.g., method 300), as described herein, and/or any other operations or functions. The instructions 252 can be software written in any suitable programming language or can be implemented in hardware. Additionally, and/or alternatively, the instructions 252 can be executed in logically and/or virtually separate threads on processor(s) 248. The memory device(s) 250 can further store data (such as data from sensor 244; not separately depicted) that can be accessed by the processor(s) 248.

The exemplary controller 246 depicted also includes a network interface 254 used to communicate, for example, with the components of the fuel oxygen conversion unit 200 (e.g., via a network, or rather a wireless communication network 256 for the embodiment shown). The network interface 254 can include any suitable components for interfacing with one or more network(s), including for example, transmitters, receivers, ports, controllers, antennas, and/or other suitable components.

The inherent flexibility of computer-based systems and controllers, however, allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring still to the embodiment depicted in FIG. 2, it will further be appreciated that for the embodiment shown, the sensor 244, the first shut off valve 240, and the second shut off valve 242 are each operably connected, or operably in communication with, the controller 246 through the wireless communication network 256. However, in other embodiments, any other suitable communication network may be provided, such as a wired or combination wired and wireless communication network.

In such a manner, it will further be appreciated that the first shut off valve 240, the second shut off valve 242, or both may be configured as electrically actuated fluid valves. Accordingly, the controller 246 may be configured to completely shut off the stripping gas 220 flow through the circulation gas flowpath 206 during certain operations (e.g., when the separation assembly 234 of the fuel gas separator 204 is rotating below the minimally efficient rotational speed, during a failure scenario, etc.). Additionally, or alternatively, the controller 246 may be configured to actuate one or both of the first shut off valve 240 and second shut off valve 242 to one or more intermediate positions, such that the first shut off valve 240 and second shutoff valve may simply reduce the stripping gas 220 flow therethrough.

It will be appreciated that when the first and/or second shut off valves 240, 242 are closed, substantially no stripping gas 220 may flow through the inlet 218 of the fuel gas separator 204, such that substantially only fuel flows through the fuel gas separator 204. Such may be beneficial, e.g., during startup operating conditions to prime the fuel gas separator 204 and to allow it time to come up to speed. Additionally, such may be helpful during shut down operating conditions of the engine, wherein the rotational speed is decreasing.

Notably, in at least one exemplary aspect, the first shut off valve 240 and second shutoff valve 242 may be completely closed when the gas turbine engine and fuel oxygen conversion unit 200 is entering into a shut off or shut down operating mode. In such a manner, a flow of stripping gas 220 from the circulation gas flowpath 206 may be stopped, and the relatively low oxygen content gas within the circulation gas flowpath 206 may be trapped and stored between the first shut off valve 240 and second shutoff valve within the circulation gas flowpath 206. Subsequently, when the gas turbine engine including the exemplary fuel oxygen conversion unit 200 is started back up, and gas is reintroduced to the fuel gas separator 204, and more specifically, when the first shut off valve 240 and/or second shutoff valve 242 are opened, the system may automatically be operating with a relatively high efficiency, as the stripping gas 220 being introduced is the same gas previously trapped and stored having a relatively low oxygen content.

Notably, however, in other embodiments, any other suitable configuration may be provided to allow the fuel oxygen conversion unit 200 to operate with relatively high efficiency during, e.g., initial startup. For example, referring now briefly to FIG. 3, a fuel oxygen conversion unit 200 in accordance with another exemplary embodiment of the present disclosure is provided. The exemplary fuel oxygen conversion unit 200 of FIG. 3 may be configured in substantially the same manner as exemplary fuel oxygen conversion unit 200 described above with reference to FIG. 2. Accordingly, the same or similar numbers may refer to same or similar part.

Figure 3:
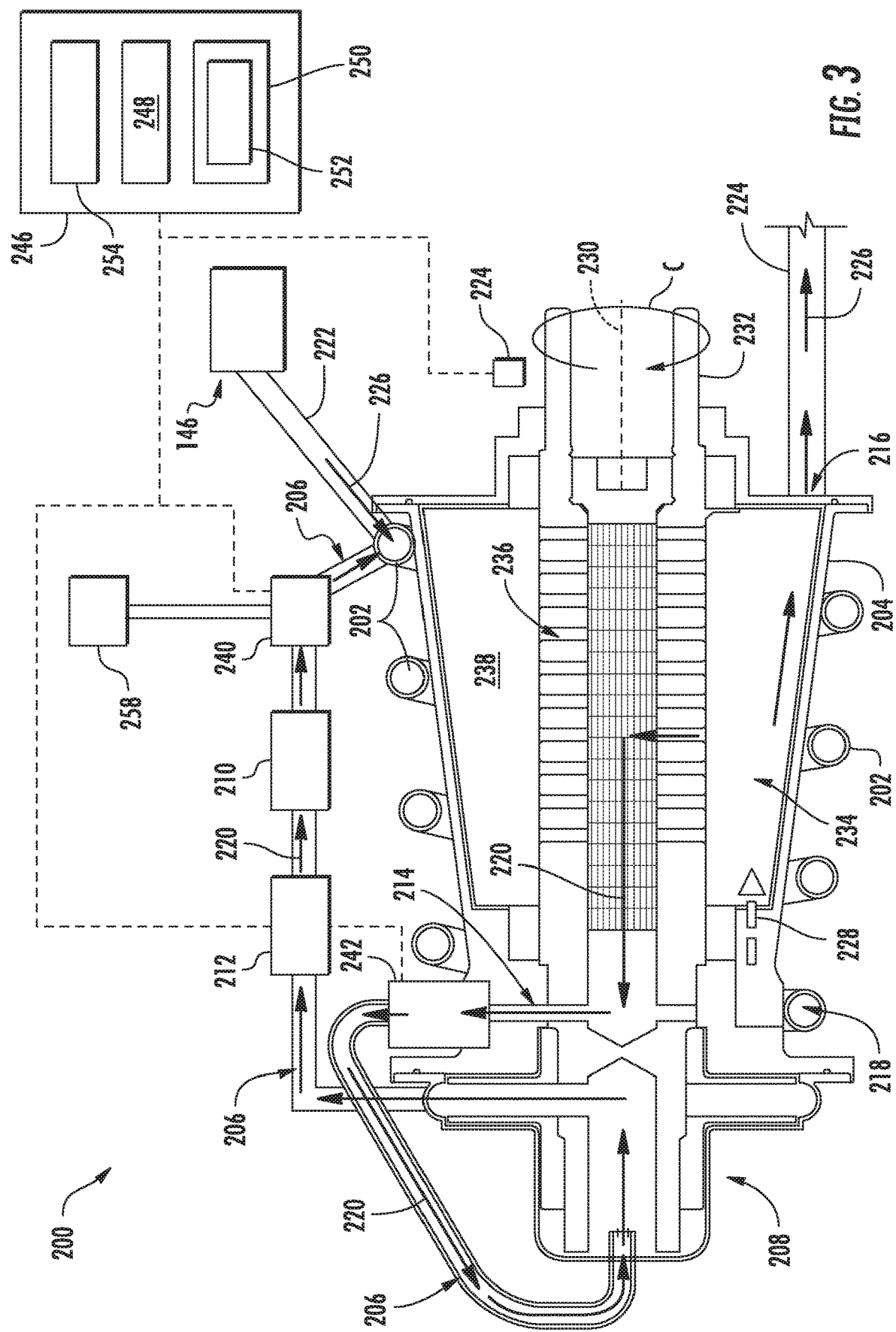
FIG. 3 is a schematic, cross-sectional view of a fuel oxygen conversion unit in accordance with another exemplary embodiment of the present disclosure.

However, for the embodiment of FIG. 3, the fuel oxygen conversion unit 200 further includes a stripping gas source 258 selectively in fluid communication with the circulation gas flowpath 206 for selectively introducing a stripping gas from the stripping gas source 258 to the circulation gas flowpath 206. More specifically, for the exemplary embodiment depicted, the stripping gas source 258 is a stripping gas tank selectively in airflow communication with the circulation gas flowpath 206. The stripping gas tank may be positioned, e.g., within the gas turbine engine (e.g., within the casing 106 of the turbomachine 104 of the gas turbine engine of, e.g., FIG. 1), or alternatively, may be positioned remote from the gas turbine engine (e.g., within a wing or fuselage of an aircraft including the gas turbine engine). Notably, for the embodiment shown, the stripping gas source 258 is selectively fluidly connected to the circulation gas flowpath 206 at a location upstream of the contactor 202 and downstream of the catalyst 210. More specifically, the exemplary stripping gas source 258 depicted is selectively fluidly connected to the circulation gas flowpath 206 through the first shutoff valve 240. In such a manner, the first shutoff valve 240 may be a three-way valve configured to vary a ratio of stripping gas 220 from the circulation gas flowpath 206 to gas from the stripping gas source 258 being provided to the contactor 202 of the oxygen conversion unit 200. The first shutoff valve 240 may vary such ratio to any suitable value between 1:100 and 100:1, inclusive of the endpoints. Additionally, the first shutoff valve 240 may completely shut off stripping gas 220 flow to the contactor 202 for the embodiment shown. Notably, however, in other embodiments, the fuel oxygen conversion unit 200 may have a separate valve for introducing a gas flow from the stripping gas source 258.

In such a manner, it will be appreciated that the stripping gas provided from the stripping gas source 258 to the circulation gas flowpath 206 may have a relatively low oxygen content (such as less than about five (5) ppm, such as less than about two (2) ppm, such as less than about one (1) ppm, such as less than about 0.5 ppm (e.g., an inert gas from an inert gas tank)), such that it may assist with the oxygen conversion of fuel 226 immediately upon introduction to the circulation gas flowpath 206 and/or contactor 202.

It will be appreciated, however, that the exemplary system and fuel oxygen conversion unit 200 of FIGS. 2 and 3 are provided by way of example only. In other exemplary embodiments, any other suitable fuel oxygen conversion unit 200 may be provided. For example, referring now to FIG. 4, a schematic view of a fuel oxygen conversion unit 200 in accordance another exemplary embodiment of the present disclosure is depicted. The exemplary fuel oxygen conversion unit 200 of FIG. 4 may be configured in substantially the same manner as exemplary fuel oxygen conversion unit 200 described above with reference to FIG. 2.

Figure 4:
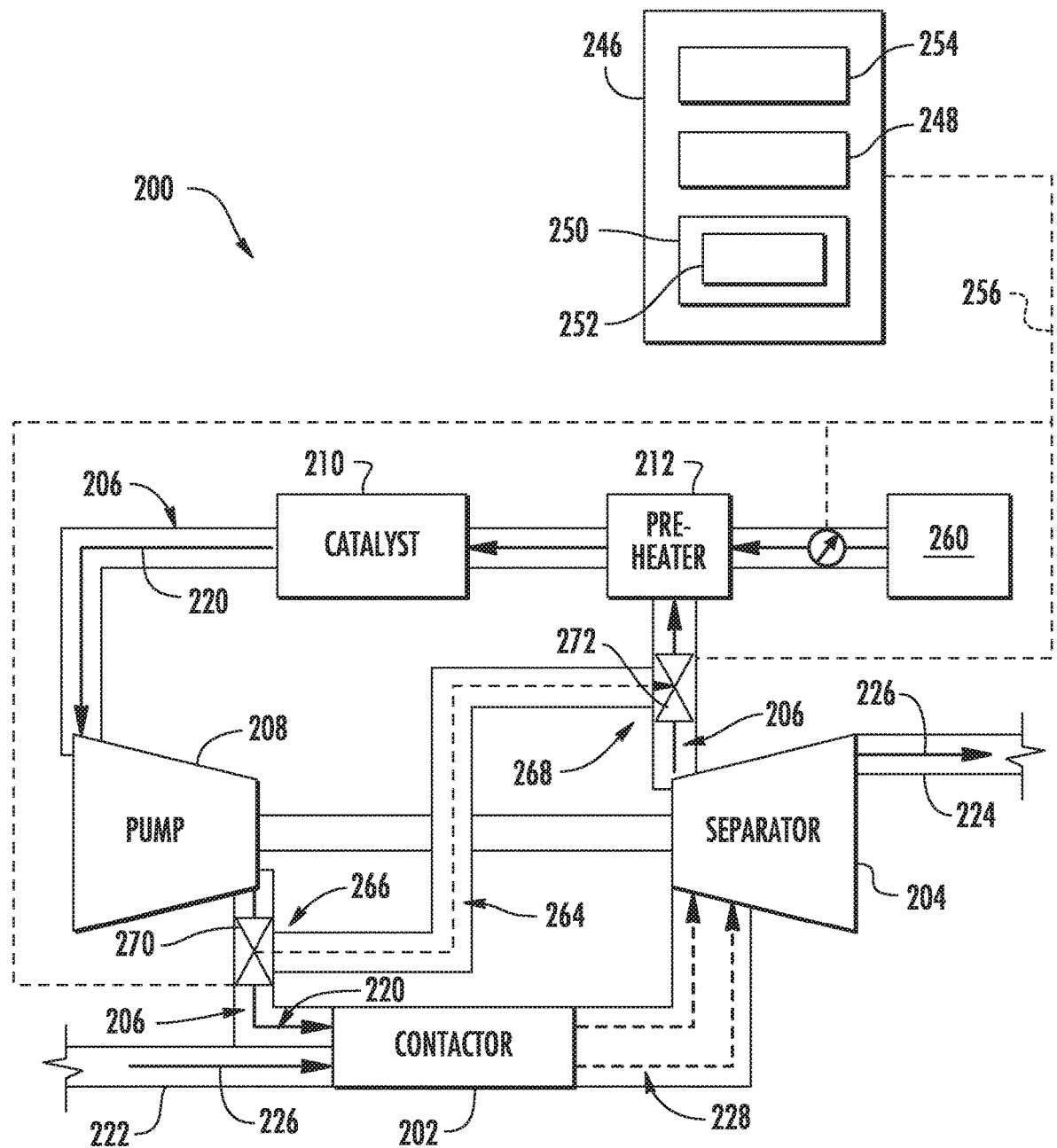
FIG. 4 is a schematic, cross-sectional view of a fuel oxygen conversion unit in accordance with yet another exemplary embodiment of the present disclosure.

Accordingly, for example, the exemplary fuel oxygen conversion unit 200 of FIG. 4 generally includes a contactor 202, a fuel gas separator 204, a pre-heater 212, a catalyst 210, and a gas boost pump 208. Moreover, the exemplary fuel oxygen conversion unit 200 generally defines a circulation gas flowpath 206 from the fuel gas separator 204 to the contactor 202, with, for the embodiment depicted in FIG. 4, the pre-heater 212, catalyst 210, and gas boost pump 208 being positioned within or otherwise fluidly connected to the circulation gas flowpath 206. As with the embodiment described above, the gas boost pump 208 and fuel gas separator 204 are mechanically coupled, such that the gas boost pump 208 is rotatable with the fuel gas separator 204. Notably, however, for the embodiment of FIG. 4, the pre-heater 212 and catalyst 210 are positioned upstream from the gas boost pump 208 in the circulation gas flowpath 206 (whereas in the embodiment of FIG. 2, the pre-heater 212 and catalyst 210 are located downstream of the gas boost pump 208 within the circulation gas flowpath 206).

Briefly, it will also be appreciated that the exemplary fuel oxygen conversion unit 200 depicted includes a makeup gas source 260 fluidly connected to the circulation gas flowpath 206. The makeup gas source 260 may be any suitable gas source. For example, in certain embodiments, the makeup gas source 260 may be a compressor section of a gas turbine engine including the fuel oxygen conversion unit 200, such as high pressure compressor 112 of such compressor section (see FIG. 1). Additionally, or alternatively, the makeup gas source 260 may be a gas tank located within the gas turbine engine, or alternatively, located remotely from the gas turbine engine. For the embodiment depicted, the makeup gas source 260 is in airflow communication with the circulation gas flowpath 206 through a variable flow valve 262, which may be actuatable to supply additional gas to the circulation gas flowpath 206 as needed. Although not depicted, the fuel oxygen conversion unit 200 may include one or more sensors for determining an airflow volume/ flowrate through the circulation gas flowpath 206 to determine an amount of, if any, makeup gas that is needed.

Further, the exemplary fuel oxygen conversion unit 200 of FIG. 4 includes an isolation valve in airflow communication with the circulation gas flowpath 206 for modulating a stripping gas 220 flow through the circulation gas flowpath 206 to the contactor 202. However, for the embodiment of FIG. 4, the isolation valve is not configured as a shutoff valve and instead is configured as a diverter valve. More specifically, for the exemplary embodiment of FIG. 4, the fuel oxygen conversion unit 200 further defines a bypass gas flowpath 264 in fluid communication with the circulation gas flowpath 206 for bypassing the contactor 202 and the fuel gas separator 204 during certain operations. More specifically, the exemplary bypass gas flowpath 264 is in fluid communication with the circulation gas flowpath 206 at a first location 266 positioned upstream of the contactor 202 and a second location 268 positioned downstream of the fuel gas separator 204. More specifically, for the embodiment depicted, the first location 266 is further positioned downstream of the gas boost pump 208 (i.e., between the gas boost pump 208 and the contactor 202) and the second location 268 is positioned upstream of the catalyst 210 and pre-heater 212 (i.e., between the catalyst 210 and the fuel gas separator 204).

Moreover, for the embodiment depicted in FIG. 4, the diverter valve is a first diverter valve 270 positioned at the first location 266, and the fuel oxygen conversion unit 200 further includes a second diverter valve 272 positioned at the second location 268. Notably, however, in other embodiments, the fuel oxygen conversion unit 200 may only include one diverter valve, with such diverter valve being positioned at the first location 266, or alternatively, the second location 268. It should also be appreciated that the term "diverter valve" simply refers to a valve, or plurality of valves capable of redirecting at least a portion of a fluid flow from a first fluid path to a second fluid path. Accordingly, in certain exemplary embodiments, one or both of the diverter valves 270, 272 may be configured as a variable, three-way fluid valve, as a two-way shut off valve (located downstream of a junction, as a pair of shut off valves, etc.

The exemplary diverter valves 270, 272 depicted are further in fluid communication with the bypass gas flowpath 264 and are configured for selectively diverting the flow of stripping gas 220 through the circulation gas flowpath 206 to the bypass gas flowpath 264, and around the contactor 202 and separator 204. For example, the diverter valves 270, 272 may be configured to divert one hundred percent (100%) of the flow of stripping gas 220 through the circulation gas flowpath 206 to the bypass gas flowpath 264 to substantially completely bypass the contactor 202 and separator 204 during certain operations. However, in other exemplary embodiments, the diverter valves 270, 272 may be configured to divert less than one hundred percent (100%) of the flow of stripping gas 220 through the circulation gas flowpath 206 to the bypass gas flowpath 264 (such as at least ten percent (10%), such as at least twenty percent (20%), such as at least fifty percent (50%), such as up to fifty percent (50%), such as up to seventy-five percent (75%), such as up to ninety percent (90%)).

Briefly, it will further be appreciated that the exemplary fuel oxygen conversion unit 200 is operable with a controller 246, the controller 246 configured to control certain operations of the fuel oxygen conversion unit 200. More specifically, for the exemplary aspect depicted in FIG. 4, the first diverter valve 270, the second diverter valve 272, and the variable flow valve 262 are each operably coupled to the controller 246 through a wireless communication network 256. The controller 246 depicted in FIG. 4 may be configured in substantially the same manner as exemplary control described above with reference FIG. 2.

In such a manner, the fuel oxygen conversion unit 200 may be configured to divert a flow of stripping gas 220 around the contactor 202 and separator 204 during certain operations, such as when a separation assembly 234 of the fuel gas separator 204 is rotating below a minimally efficient rotational speed (see discussion above with reference to FIG. 2). Such may therefore prevent or minimize an amount of gas is being provided to a combustion section of a gas turbine engine including the fuel oxygen conversion unit 200.

Figure 5:
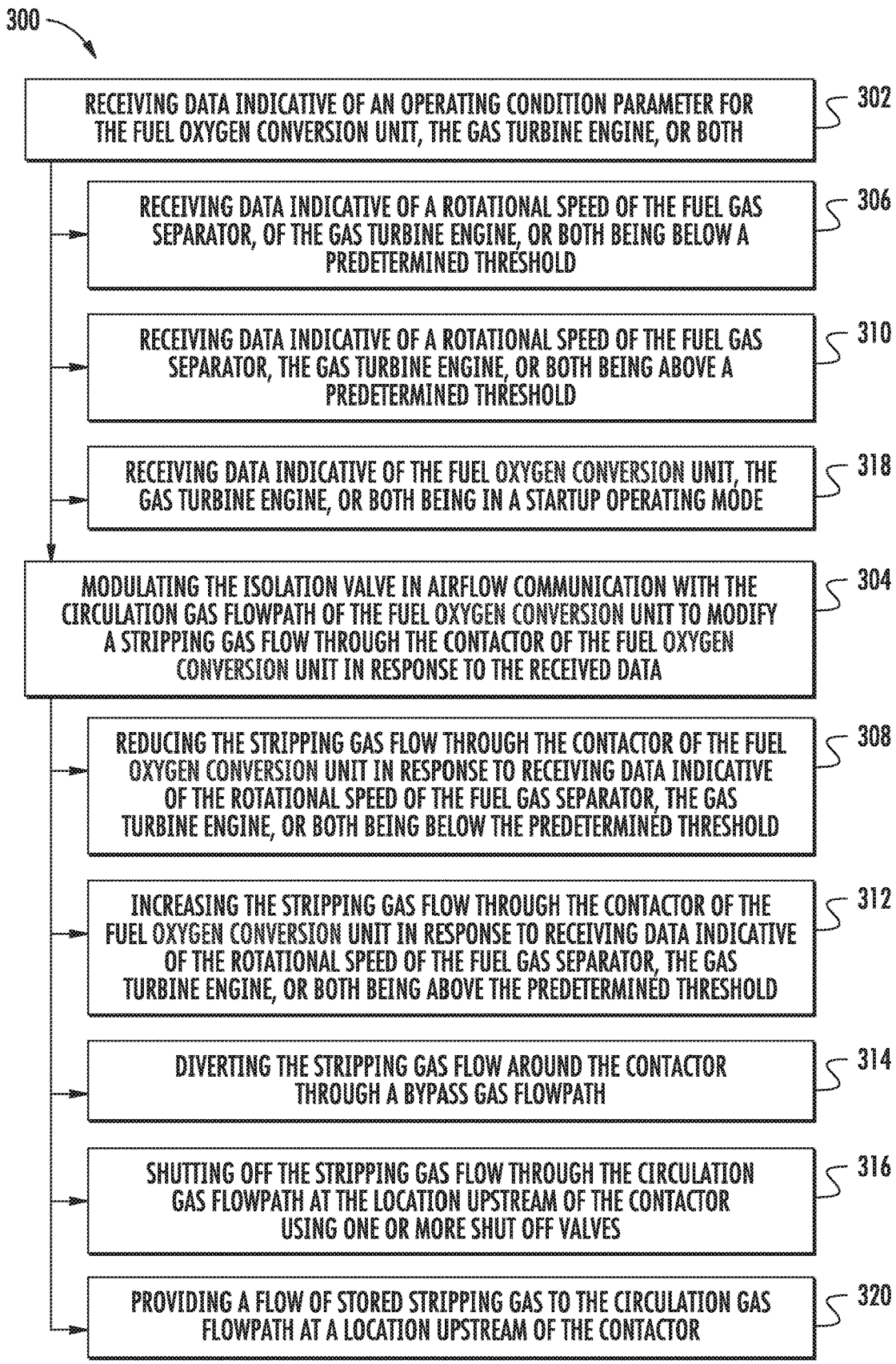
FIG. 5 is a flow diagram of a method for operating a fuel oxygen conversion unit in accordance with an exemplary aspect of the present disclosure.

Referring now to FIG. 5, a method 300 of operating a fuel oxygen conversion unit for a gas turbine engine is provided. In certain example aspects, the method 300 may be utilized to operate one or more of the exemplary fuel oxygen conversion units described above with reference to FIGS. 1 through 4. Accordingly, the exemplary fuel oxygen conversion unit operated by the method 300 may generally define a circulation gas flowpath and may generally include a contactor, a fuel gas separator, and an isolation valve. Additionally, in certain exemplary aspects, the method 300 may be executed using a suitable control system.

The exemplary method 300 depicted in FIG. 5 includes at (302) receiving data indicative of an operating condition parameter for the fuel oxygen conversion unit, the gas turbine engine, or both. Additionally, the exemplary method 300 includes at (304) modulating the isolation valve in airflow communication with the circulation gas flowpath of the fuel oxygen conversion unit to modify a stripping gas flow through the contactor of the fuel oxygen conversion unit in response to the received data at (302). The contactor is positioned upstream of the fuel gas separator of the fuel oxygen conversion unit for the exemplary aspect described herein with reference to FIG. 5.

More specifically, for the exemplary aspect depicted, the operating condition parameter is a speed parameter and the speed parameter is indicative of a rotational speed of the fuel gas separator of the fuel oxygen conversion unit, of the gas turbine engine, or both. With such an exemplary aspect, receiving data indicative of the speed parameter at (302) includes at (306) receiving data indicative of a rotational speed of the fuel gas separator, of the gas turbine engine, or both being below a predetermined threshold. For example, when receiving data at (306) includes receiving data indicative of a rotational speed of the fuel gas separator, the data may be indicative of the fuel gas separator being operated below a minimally efficient rotational speed. With such an exemplary aspect, modulating the isolation valve in airflow communication with the circulation gas flowpath at (304) further includes at (308) reducing the stripping gas flow through the contactor of the fuel oxygen conversion unit in response to receiving data indicative of the rotational speed of the fuel gas separator, the gas turbine engine, or both being below the predetermined threshold at (306).

In such a manner, the method 300 may determine the fuel gas separator is not operating at a desired efficiency and may reduce a gas flow, or shut off the gas flow, to the contactor to minimize an amount of gas within the fuel downstream of the fuel gas separator.

It will be appreciated, however, that in other exemplary aspects, the fuel gas separator may be operating at a desired efficiency. More specifically, in other exemplary aspects, as is depicted in phantom, receiving data indicative of the speed parameter at (302) may include at (310) receiving data indicative of a rotational speed of the fuel gas separator, the gas turbine engine, or both being above a predetermined threshold. For example, when receiving data at (310) includes receiving data indicative of a rotational speed of the fuel gas separator, the data may be indicative of the fuel gas separator being operated at or above a minimally efficient rotational speed. With such an exemplary aspect, modulating the isolation valve in airflow communication with the circulation gas flowpath at (304) may include at (312) increasing the stripping gas flow through the contactor of the fuel oxygen conversion unit in response to receiving data indicative of the rotational speed of the fuel gas separator, the gas turbine engine, or both being above the predetermined threshold at (310).

Notably, when warranted (see, e.g., exemplary aspect (306)), the method 300 may reduce the stripping gas flow through the contactor in any suitable manner. For example, in certain exemplary aspects, modulating the isolation valve in airflow communication with the circulation gas flowpath at (304) may include at (314) diverting the stripping gas flow around the contactor through a bypass gas flowpath. In at least certain exemplary aspects, diverting the stripping gas flow around the contactor through the bypass gas flowpath at (314) may include diverting the stripping gas flow around the contactor using one or more diverter valves (see, e.g., FIG. 4). Alternatively, in other exemplary aspects, modulating the valve in airflow communication with the circulation gas flowpath at (304) may include at (316) shutting off the stripping gas flow through the circulation gas flowpath at a location upstream of the contactor. In at least certain exemplary aspects, shutting off the stripping gas flow through the circulation gas flowpath at the location upstream of the contactor at (316) may include shutting off the stripping gas flow through the circulation gas flowpath at the location upstream of the contactor using one or more shut off valves (see, e.g., FIGS. 2-3).

Further, in certain exemplary aspects of the method 300, the operating condition parameter may be indicative of an operating mode of the fuel oxygen conversion unit, the gas turbine engine, or both. For example, the operating condition parameter may be indicative of the gas turbine engine, the fuel oxygen conversion unit, or both being in a startup mode (i.e., a sub-idle mode), an idle mode, a takeoff mode (i.e., when an aircraft including the gas turbine engine is taking off), a cruise mode (i.e., when the aircraft including gas turbine engine is operating in cruise), a descent mode (i.e., when the aircraft including gas turbine engine is descending), and/or a shutdown mode (i.e., when the gas turbine engine is shutting down). With such an exemplary aspect, receiving data indicative of the operating condition parameter at (302) includes at (318) receiving data indicative of the fuel oxygen conversion unit, the gas turbine engine, or both being in a startup operating mode, and modulating the isolation valve in airflow communication with the circulation gas flowpath of the fuel oxygen conversion unit (304) may include at (320) providing a flow of stored stripping gas to the circulation gas flowpath at a location upstream of the contactor. The stored stripping gas may have a relatively low oxygen content, and may be stored in a stripping gas tank or other container (such as simply a circulation gas flowpath) located within the gas turbine engine or remote from the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel oxygen conversion unit for a vehicle or an engine of the vehicle comprising:
   a contactor;
   a fuel gas separator, the fuel oxygen conversion unit defining a circulation gas flowpath from the fuel gas separator to the contactor; and
   an isolation valve in airflow communication with the circulation gas flowpath for modulating a gas flow through the circulation gas flowpath to the contactor,
   wherein the fuel oxygen conversion unit further defines a bypass gas flowpath in fluid communication with the circulation gas flowpath at a first location positioned upstream of the contactor and a second location positioned downstream of the fuel gas separator, such that the bypass gas flowpath and a portion of the circulation gas flowpath forms a gas flow loop that excludes the fuel gas separator, and
   wherein the isolation valve is further in fluid communication with the bypass gas flowpath and configured for selectively diverting the gas flow through the circulation gas flowpath to the bypass gas flowpath.

2. The fuel oxygen conversion unit of claim 1, wherein the isolation valve is a diverter valve positioned at the first location or at the second location.

3. The fuel oxygen conversion unit of claim 1, wherein the isolation valve is a first diverter valve positioned at the first location, and wherein the fuel oxygen conversion unit further comprises a second diverter valve positioned at the second location.

4. The fuel oxygen conversion unit of claim 1, further comprising:
   a gas boost pump, wherein the first location is further positioned downstream of the gas boost pump.

5. The fuel oxygen conversion unit of claim 1, further comprising:
   a catalyst, wherein the second location is further positioned upstream of the catalyst.

6. The fuel oxygen conversion unit of claim 1, further comprising:
   a gas boost pump, wherein the gas boost pump and the fuel gas separator are mechanically coupled such that the gas boost pump is rotatable with the fuel gas separator.

7. The fuel oxygen conversion unit of claim 1, wherein the isolation valve is a shutoff valve for shutting off the gas flow through the circulation gas flowpath.

8. A fuel oxygen conversion unit for a vehicle or an engine of the vehicle comprising:
   a contactor;
   a fuel gas separator, the fuel oxygen conversion unit defining a circulation gas flowpath from the fuel gas separator to the contactor; and
   an isolation valve in airflow communication with the circulation gas flowpath for modulating a gas flow through the circulation gas flowpath to the contactor,
   wherein the isolation valve is a shutoff valve for shutting off the gas flow through the circulation gas flowpath,
   wherein the shut off valve is a first shutoff valve, and
   wherein the fuel oxygen conversion unit further comprises:
   a second shutoff valve,
   wherein the first shutoff valve is positioned upstream of the contactor in the circulation gas flowpath,
   wherein the second shutoff valve is positioned downstream of the fuel gas separator in the circulation gas flowpath, and
   wherein the second shut off valve and the first shut off valve are disposed in the circulation gas flowpath between the fuel gas separator and contactor such that, when both the first shut off valve and the second shut off valve are closed, an amount of circulation gas is trapped between the second shut off valve and the first shut off valve.

9. The fuel oxygen conversion unit of claim 8,
   wherein the fuel oxygen conversion unit further comprises:
   a catalyst; and
   a gas boost pump,
   wherein the first shutoff valve is positioned downstream of the catalyst and the gas boost pump, and
   wherein the second shutoff valve is positioned upstream of the catalyst and the gas boost pump.

10. A fuel oxygen conversion unit for a vehicle or an engine of the vehicle comprising:
    a contactor;
    a fuel gas separator, the fuel oxygen conversion unit defining a circulation gas flowpath from the fuel gas separator to the contactor; and
    an isolation valve in airflow communication with the circulation gas flowpath for modulating a gas flow through the circulation gas flowpath to the contactor,
    a stripping gas source disposed outside of the circulation gas flowpath and selectively in fluid communication with the circulation gas flowpath for selectively introducing a stripping gas from the stripping gas source to the circulation gas flowpath, wherein the isolation valve comprises:
a first inlet for receiving gas from the circulation gas flowpath, and
a second inlet for receiving the stripping gas from the stripping gas source, and wherein the isolation valve is operable to decrease an amount of the gas from the circulation gas flowpath while increasing the amount of the stripping gas from the stripping gas source.

11. The fuel oxygen conversion unit of claim 10, wherein the stripping gas source is a stripping gas tank.

12. A method of operating a fuel oxygen conversion unit for a gas turbine engine, the fuel oxygen conversion unit comprising a contactor, a fuel gas separator, the fuel oxygen conversion unit defining a circulation gas flowpath from the fuel gas separator to the contactor, and an isolation valve in airflow communication with the circulation gas flowpath for modulating a gas flow through the circulation gas flowpath to the contactor, wherein the isolation valve is a shutoff valve for shutting off the gas flow through the circulation gas flowpath, wherein the shut off valve is a first shutoff valve, wherein the fuel oxygen conversion unit further comprises:
a second shutoff valve, wherein the first shutoff valve is positioned upstream of the contactor in the circulation gas flowpath, and wherein the second shutoff valve is positioned downstream of the fuel gas separator in the circulation gas flowpath, and wherein the second shut off valve and the first shut off valve are disposed in the circulation gas flowpath between the fuel gas separator and contactor such that, when both the first shut off valve and the second shut off valve are closed, an amount of circulation gas is trapped between the second shut off valve and the first shut off valve, the method comprising:
receiving data indicative of an operating condition parameter for the fuel oxygen conversion unit, the gas turbine engine, or both; and
modulating the isolation valve in airflow communication with the circulation gas flowpath of the fuel oxygen conversion unit to modify a stripping gas flow to or through the contactor of the fuel oxygen conversion unit in response to the received data, the contactor positioned upstream of the fuel gas separator of the fuel oxygen conversion unit.

13. The method of claim 12, wherein the operating condition parameter is a speed parameter, and wherein the speed parameter is indicative of a rotational speed of the fuel gas separator of the fuel oxygen conversion unit, the gas turbine engine, or both.

14. The method of claim 13, wherein receiving data indicative of the speed parameter comprises receiving data indicative of a rotational speed of the fuel gas separator, the gas turbine engine, or both being below a predetermined threshold, and wherein modulating the isolation valve in airflow communication with the circulation gas flowpath comprises reducing the stripping gas flow to or through the contactor of the fuel oxygen conversion unit in response to receiving data indicative of the rotational speed of the fuel gas separator, the gas turbine engine, or both being below the predetermined threshold.

15. The method of claim 13, wherein receiving data indicative of the speed parameter comprises receiving data indicative of a rotational speed of the fuel gas separator, the gas turbine engine, or both being above a predetermined threshold, and wherein modulating the isolation valve in airflow communication with the circulation gas flowpath comprises increasing the stripping gas flow to or through the contactor of the fuel oxygen conversion unit in response to receiving data indicative of the rotational speed of the fuel gas separator, the gas turbine engine, or both being above the predetermined threshold.

16. The method of claim 12, wherein modulating the isolation valve in airflow communication with the circulation gas flowpath comprises diverting the stripping gas flow around the contactor through a bypass gas flowpath.

17. The method of claim 12, wherein modulating the isolation valve in airflow communication with the circulation gas flowpath comprises shutting off the stripping gas flow through the circulation gas flowpath at a location upstream of the contactor.

18. The method of claim 12, wherein the operating condition parameter is indicative of an operating mode of the fuel oxygen conversion unit, the gas turbine engine, or both, and wherein receiving data indicative of the operating condition parameter comprises receiving data indicative of the fuel oxygen conversion unit, the gas turbine engine, or both being in a startup operating mode, and wherein modulating the isolation valve in airflow communication with the circulation gas flowpath of the fuel oxygen conversion unit comprises providing a flow of stored stripping gas to the circulation gas flowpath at a location upstream of the contactor.

19. A gas turbine engine of the vehicle comprising:
the fuel oxygen conversion unit according to claim 8;
a combustion section; and
a fuel delivery system for providing a flow of fuel to the combustion section,
wherein the contactor defines a liquid fuel inlet, a stripping gas inlet, and a fuel/gas mixture outlet;
wherein the fuel gas separator defines a fuel/gas mixture inlet, a liquid fuel outlet, and a stripping gas outlet,
wherein the liquid fuel inlet of the contactor and the liquid fuel outlet of the fuel gas separator are in fluid communication with the fuel delivery system,
wherein the fuel oxygen conversion unit defines the circulation gas flowpath from the stripping gas outlet of the fuel gas separator to the stripping gas inlet of the contactor.

* * * * *